(12) United States Patent
Nam (10) Patent No.: US 12,031,467 B2
(45) Date of Patent: Jul. 9, 2024

(54) APPARATUS FOR REDUCING GREENHOUSE GAS EMISSION IN VESSEL COOPERATED WITH EXHAUST GAS RECIRCULATION AND INTELLIGENT CONTROL BY EXHAUST RECYCLING AND VESSEL INCLUDING THE SAME

(71) Applicant: DAEWOO SHIPBUILDING & MARINE ENGINEERING CO., LTD., Geoje-si (KR)

(72) Inventor: Byung Tak Nam, Geoje-si (KR)

(73) Assignee: DAEWOO SHIPBUILDING & MARINE ENGINEERING CO., LTD., Geoje-si (KR)

( * ) Notice: Subject to any disclaimer, the term of this patent is extended or adjusted under 35 U.S.C. 154(b) by 0 days.

(21) Appl. No.: 18/011,823

(22) PCT Filed: Dec. 17, 2020

(86) PCT No.: PCT/KR2020/018598
§ 371 (c)(1),
(2) Date: Dec. 20, 2022

(87) PCT Pub. No.: WO2022/124464
PCT Pub. Date: Jun. 16, 2022

(65) Prior Publication Data
US 2023/0243284 A1    Aug. 3, 2023

(30) Foreign Application Priority Data
Dec. 10, 2020   (KR) .................. 10-2020-0171947

(51) Int. Cl.
*F01N 3/04*      (2006.01)
*B01D 47/06*     (2006.01)
(Continued)

(52) U.S. Cl.
CPC ............ *F01N 3/04* (2013.01); *B01D 53/1475* (2013.01); *B01D 53/1493* (2013.01); *C02F 1/66* (2013.01);
(Continued)

(58) Field of Classification Search
CPC ........ F01N 3/04; F01N 3/0857; F01N 13/004; F01N 2340/06; F01N 2570/04;
(Continued)

(56) References Cited

U.S. PATENT DOCUMENTS

2014/0356267 A1    12/2014   Hunwick

FOREIGN PATENT DOCUMENTS

DE    102015119561 A1 *  5/2016   ............. B01D 53/04
JP    2004-231449 A       8/2004
(Continued)

OTHER PUBLICATIONS

English Machine Translation of KR101201426B1 via USPTO Fit Database (Year: 2012).*

(Continued)

*Primary Examiner* — Dominick L Plakkoottam
*Assistant Examiner* — Paul W Thiede
(74) *Attorney, Agent, or Firm* — Park, Kim & Suh, LLC (57) ABSTRACT

The present invention relates to an apparatus for reducing greenhouse gas emission in a vessel cooperated with exhaust gas recirculation (EGR) and intelligent control by exhaust recycling (iCER), and a vessel including the same, in which EGR and iCER are combined so that $NO_x$ generation is reduced by EGR and $CO_2$ and $SO_x$ are absorbed and converted into materials that do not affect environments, thereby preventing corrosion of an engine, improving combustion quality, increasing engine efficiency by iCER, and reducing methane slip.

18 Claims, 6 Drawing Sheets

(51) Int. Cl.
| | |
|---|---|
| *B01D 53/14* | (2006.01) |
| *B01D 53/18* | (2006.01) |
| *B01D 53/50* | (2006.01) |
| *B01D 53/62* | (2006.01) |
| *B01D 53/78* | (2006.01) |
| *B01D 53/92* | (2006.01) |
| *C02F 1/66* | (2023.01) |
| *F01N 3/08* | (2006.01) |
| *F01N 13/00* | (2010.01) |
| *F02B 75/02* | (2006.01) |
| *F02M 26/15* | (2016.01) |
| *F02M 26/28* | (2016.01) |
| *F02M 26/34* | (2016.01) |
| *F02M 26/35* | (2016.01) |

(52) U.S. Cl.
CPC ............ *F02M 26/28* (2016.02); *F02M 26/35* (2016.02); *B01D 47/06* (2013.01); *B01D 53/18* (2013.01); *B01D 53/50* (2013.01); *B01D 53/62* (2013.01); *B01D 53/78* (2013.01); *B01D 53/92* (2013.01); *B01D 2252/103* (2013.01); *B01D 2257/302* (2013.01); *B01D 2257/504* (2013.01); *B01D 2258/012* (2013.01); *C02F 2209/06* (2013.01); *F01N 3/0857* (2013.01); *F01N 13/004* (2013.01); *F01N 2340/06* (2013.01); *F01N 2570/04* (2013.01); *F01N 2570/10* (2013.01); *F01N 2590/02* (2013.01); *F01N 2610/1406* (2013.01); *F01N 2610/1433* (2013.01); *F01N 2610/1453* (2013.01); *F02B 2075/025* (2013.01); *F02B 2075/027* (2013.01); *F02M 26/15* (2016.02); *F02M 26/34* (2016.02)

(58) Field of Classification Search
CPC ............. F01N 2570/10; F01N 2590/02; F01N 2610/1406; F01N 2610/1433; F01N 2610/1453; B01D 53/1475; B01D 53/1493; B01D 47/06; B01D 53/18; B01D 53/50; B01D 53/62; B01D 53/78; B01D 53/92; B01D 2252/103; B01D 2257/302; B01D 2257/504; B01D 2258/012; C02F 1/66; C02F 2209/06; F02M 26/28; F02M 26/35; F02M 26/15; F02M 26/34; F02B 2075/025; F02B 2075/027

See application file for complete search history.

(56) References Cited

FOREIGN PATENT DOCUMENTS

| | | |
|---|---|---|
| JP | 2010-101320 A | 5/2010 |
| JP | 2017-210963 A | 11/2017 |
| KR | 10-1201426 B1 | 11/2012 |
| KR | 10-2013-0078308 A | 7/2013 |
| KR | 10-1379856 B1 | 4/2014 |
| KR | 10-2015-0121238 A | 10/2015 |
| KR | 10-2016-0102339 A | 8/2016 |
| KR | 10-2018-0019890 A | 2/2018 |
| KR | 10-2019-0109208 A | 9/2019 |
| KR | 10-2031210 B1 | 10/2019 |
| KR | 10-2020-0084283 A | 7/2020 |
| KR | 10-2020-0115919 A | 10/2020 |
| WO | WO-2011105120 A1 * | 9/2011 ......... B01D 53/1425 |

OTHER PUBLICATIONS

English Machine Translation of KR 10-2018-0019890A via USPTO Datebase (Year: 2018).*

International Search Report in International Application No. PCT/KR2020/018598, dated Sep. 7, 2021, 2pages.

* cited by examiner

APPARATUS FOR REDUCING GREENHOUSE GAS EMISSION IN VESSEL COOPERATED WITH EXHAUST GAS RECIRCULATION AND INTELLIGENT CONTROL BY EXHAUST RECYCLING AND VESSEL INCLUDING THE SAME

CROSS-REFERENCE TO RELATED APPLICATIONS

This application is the National Stage filing under 35 U.S.C. 371 of International Application No. PCT/KR2020/018598, filed on Dec. 17, 2020, which claims the benefit of Korean Patent Application No. 10-2020-0171947, filed on Dec. 10, 2020, the contents of which are all hereby incorporated by reference herein in their entirety.

TECHNICAL FIELD

The present invention relates to an apparatus for reducing greenhouse gas emission in a vessel cooperated with exhaust gas recirculation (EGR) and intelligent control by exhaust recycling (iCER), and a vessel including the same, in which EGR and iCER are combined so that $NO_x$ generation is reduced by EGR and $CO_2$ and $SO_x$ are absorbed and converted into materials that do not affect environments, thereby preventing corrosion of an engine, improving combustion quality, increasing engine efficiency by iCER, and reducing methane slip.

BACKGROUND ART

Recently, global warming and related environmental disasters have occurred due to the influence of greenhouse gas emission caused by indiscriminate use of fossil fuels.

In this regard, a series of technologies related to capture and storage of carbon dioxide, which is the representative greenhouse gas, without carbon dioxide emission are called carbon dioxide capture and storage (CCS) technologies. In recent years, CCS technologies have attracted much attention. Among CCS technologies, chemical absorption is the most commercialized technology in terms of enabling large-scale treatment.

In addition, carbon dioxide emission is regulated through the International Maritime Organization (IMO)'s Energy Efficiency Design Index (EEDI). The IMO is targeting a reduction of 50% or more in emissions by 2050 compared to 2008 and a reduction of 40% in emissions by 2030 compared to 2008. Therefore, technologies that do not emit $CO_2$ or capture emitted $CO_2$ are attracting attention.

The above-described technologies for reducing carbon dioxide emission or capturing generated carbon dioxide are not currently commercialized in vessels, and methods of using hydrogen or ammonia as fuel are currently under development and have not reached the level of commercialization.

On the other hand, as a method of reducing $NO_x$ in exhaust gas exhausted from a vessel engine, exhaust gas recirculation (EGR) for cleaning and cooling exhaust gas, mixing a portion of the exhaust gas with outside air, and recirculating the mixed gas to the intake system of the vessel engine is applied.

However, when EGR is used alone, there is a limitation in reducing $NO_x$ generation and increasing engine efficiency. Therefore, there is a need to apply a technology capable of reducing $NO_x$ generation, which is the original purpose of EGR, while maintaining EGR with respect to a vessel that is operating using conventional fossil fuels or is scheduled to be built, absorbing $SO_x$ as well as $CO_2$, which is the representative greenhouse gas, converting $SO_x$ and $CO_2$ into materials that do not affect environments, discharging the materials or storing the materials as useful materials, and improving combustion efficiency by drastically reducing the amount of methane gas slip emitted from a dual fuel (DF) engine for a vessel.

DISCLOSURE

Technical Problem

An object of the present invention is to provide an apparatus for reducing greenhouse gas emission in a vessel cooperated with EGR and iCER, and a vessel including the same, in which EGR and iCER are combined so that $NO_x$ generation is reduced by EGR and $CO_2$ and $SO_x$ are absorbed and converted into materials that do not affect environments, thereby preventing corrosion of an engine, improving combustion quality, increasing engine efficiency by iCER, and reducing methane slip.

Technical Solution

In order to achieve the above object, the present invention provides an apparatus for reducing greenhouse gas emission in a vessel cooperated with EGR and iCER, the apparatus including: an exhaust gas receiver that temporarily stores exhaust gas exhausted from each cylinder of a vessel engine and removes pulsation; a turbo charger that compresses and supplies scavenge air by the exhaust gas supplied from the exhaust gas receiver; a cleaning unit that removes and cleans $SO_x$ and soot by spraying cleaning water to the exhaust gas supplied through the turbo charger and cools the exhaust gas by circulating cooling water; a $CO_2$ absorbing unit that absorbs and removes $CO_2$ by spraying an absorbent liquid to the exhaust gas having passed through the cleaning unit; a scavenge air receiver that temporarily stores the scavenge air compressed by the turbo charger, removes pulsation, and supplies air to each cylinder of the vessel engine; and an exhaust gas circulating unit that supplies the turbo charger with the exhaust gas having passed through the $CO_2$ absorbing unit so as to be mixed with outside air.

Here, the vessel engine may be a low-pressure two-stroke dual fuel engine or a four-stroke dual fuel engine.

In addition, the turbo charger may include: a turbine that is rotated by high-temperature and high-pressure exhaust gas supplied from the exhaust gas receiver; a compressor that is coupled to a rotation shaft of the turbine and rotated to compress scavenge air and supply the compressed scavenge air to the scavenge air receiver; an air suction filter that is formed on a suction port side of the compressor to filter foreign matter from the outside air and the exhaust gas from which $CO_2$ has been removed by passing through the $CO_2$ absorbing unit, and mix the outside air with the exhaust gas; a scavenge air cooling module that cools the scavenge air supplied from the compressor to the scavenge air receiver; a first control valve that controls a flow rate of exhaust gas from the turbine to the cleaning unit; and a second control valve that controls a flow rate of exhaust gas supplied from the turbine to an exhaust gas use-related device.

In addition, when damage to the exhaust gas use-related device connected to an exhaust gas pipe of the turbine is expected due to a high load or high-temperature exhaust gas, opening or closing of the second control valve may be controlled so that the flow rate of the exhaust gas to the cleaning unit is increased to decrease the temperature of the exhaust gas.

In addition, the scavenge air cooling module may include: a cooling jacket of one or more stages that cools the scavenge air by circulating cooling water; and a mist catcher that is formed in a curved multi-plate shape and removes moisture from the scavenge air having passed through the cooling jacket.

In addition, the cleaning unit may include: a cleaning water supply module that receives fresh water, neutralizes and supplies the circulating cleaning water; a cleaning module that cools and cleans the exhaust gas from the turbo charger by spraying the cleaning water supplied from the cleaning water supply module to the exhaust gas supplied from the turbo charger; a cooling module that cools the exhaust gas by circulating the cooling water; a cleaning water circulation module that circulates the cleaning water through the cleaning module; and a water treatment module that performs water treatment on the cleaning water.

In addition, the cleaning water supply module may include: a cleaning water replenishing pump that receives fresh water, replenishes cleaning water, and supplies the cleaning water to the cleaning module; and a neutralizing agent supply valve that supplies a neutralizing agent for controlling pH to the circulating cleaning water supplied from the cleaning water replenishing pump to the cleaning module, the cleaning module may include one or more cleaning units that remove and clean $SO_x$ and soot by spraying the cleaning water, the cooling module may include one or more cooling units formed below the one or more cleaning units to cool the exhaust gas to a certain temperature according to a type of the absorbent liquid by the circulating cooling water, the cleaning water circulation module may include: a cleaning water circulation tank that collects the cleaning water having passed through the cleaning module; a pH meter that measures pH of the cleaning water from the cleaning water circulation tank, controls the neutralizing agent supply valve to set an input amount of the neutralizing agent; a buffer tank that storing an initial amount of cleaning water and replenishes the cleaning water; a cleaning water circulation pump and a cleaning water control valve that supply some of the cleaning water having passed through the cleaning module to the buffer tank and circulate a remaining cleaning water to the cleaning module; and a cleaning water cooling unit that is installed behind the cleaning water circulation pump and cools the circulating cleaning water, and the water treatment module may include: a water treatment unit that performs water treatment on the cleaning water drained from the buffer tank and returns the treated cleaning water to the buffer tank; a sludge tank that stores sludge by the water treatment unit; an outboard discharge valve that discharges the cleaning water satisfying a certain discharge condition by the water treatment unit to the outside of the vessel; and a cleaning water drain tank that temporarily stores the cleaning water from the buffer tank.

In addition, the $CO_2$ absorbing unit may include: an absorbent liquid storage tank that stores the absorbent liquid; one or more spray nozzles that spray the absorbent liquid; one or more passages that converts $CO_2$ into a certain material through a chemical reaction by contacting $CO_2$ with the absorbent liquid; an absorbent liquid spray pump that pumps the absorbent liquid to the one or more spray nozzles; a cooling module that circulates the cooling water to the one or more passages and cools heat generated by a $CO_2$ absorption reaction; a mist catcher that is formed at an end of the passage in a curved multi-plate shape and removes moisture from the exhaust gas having passed through the passage; and an absorbent liquid tank that separates and stores the absorbent liquid having passed through the passage.

In addition, the one or more spray nozzles may include an upper spray nozzle and a lower spray nozzle that spray the absorbent liquid downward, the one or more passages may include an upper passage and a lower passage that convert $CO_2$ into the certain material through a chemical reaction by contacting $CO_2$ with the absorbent liquid, the absorbent liquid spray pump may pump the absorbent liquid to the upper spray nozzle and the lower spray nozzle, and the cooling module may cool heat generated by the $CO_2$ absorption reaction by circulating cooling water to the upper passage and the lower passage.

In addition, the upper passage or the lower passage may be provided with a plurality of stages and partition walls to form a long passage so as to increase a contact time between the absorbent liquid and the exhaust gas.

In addition, packing materials, in which distilling column packings designed to have a large contact area per unit volume so as to increase a contact time between the absorbent liquid and the exhaust gas are provided in multi-stages, and a solution redistributor, which is formed between the distilling column packings provided in multi-stages, may be formed in the upper passage or the lower passage.

In addition, the absorbent liquid storage tank may store $NH_4OH(aq)$ as the absorbent liquid, $CO_2$ may be absorbed and converted into $NH_4HCO_3(aq)$ by $NH_4OH(aq)$ passing through the upper passage and the lower passage, and the cooling module may be disposed in the form of a cooling jacket or a cooling coil in the upper passage and the lower passage and may cool heat generated by the $CO_2$ absorption reaction to 20° C. to 50° C.

In addition, the absorbent liquid storage tank may store $NaOH(aq)$ as the absorbent liquid, $CO_2$ may be absorbed and converted into $NaHCO_3$ or $Na_2CO_3$ by $NH_4OH(aq)$ passing through the upper passage and the lower passage, and the cooling module may cool heat generated by the $CO_2$ absorption reaction to 80° C. to 100° C.

In addition, the certain material discharged through the passage may be stored in a sludge tank or discharged to the outside of the vessel.

In addition, the exhaust gas circulating unit may include: a first valve that controls a flow rate of exhaust gas supplied to the air suction filter; and a second value that controls a flow rate of exhaust gas supplied to the exhaust gas use-related device through the exhaust gas pipe.

In addition, a flow rate of the exhaust gas supplied to the turbo charger and mixed with the outside air and a flow rate of the exhaust gas supplied to the exhaust gas pipe may be individually controlled.

In addition, the cleaning unit, the $CO_2$ absorbing unit, and the exhaust gas circulating unit may be mounted inside the vessel engine.

In order to achieve the above object, the present invention may provide a vessel including the above-described apparatus.

Advantageous Effects

According to the present invention, EGR and iCER may be combined so that $NO_x$ generation is reduced by EGR and $CO_2$ and $SO_x$ are absorbed and converted into materials that do not affect environments, thereby preventing corrosion of the engine. In addition, combustion quality may be improved, and engine efficiency may be increased by iCER. Methane slip may be reduced. By removing $SO_x$ and $CO_2$ from recirculating exhaust gas, corrosion of the engine may be prevented, and environmental pollution may be reduced. The apparatus may be mounted inside a vessel engine so as to save an installation space, thereby securing a free space in an engine room. Furthermore, the apparatus may be additionally installed in a vessel in which an existing EGR system is already installed, thereby reducing the changes therein.

BEST MODE

Hereinafter, embodiments of the present invention will be described in detail with reference to the accompanying drawings so that the present invention can be easily carried out by those of ordinary skill in the art. The present invention may be embodied in many different forms and is not limited to embodiments of the present invention described herein.

An apparatus for reducing greenhouse gas emission in a vessel cooperated with EGR and iCER, according to an embodiment of the present invention, includes: an exhaust gas receiver 110 that temporarily stores exhaust gas exhausted from each cylinder of a vessel engine 10 and removes pulsation; a turbo charger 120 that compresses and supplies scavenge air by the exhaust gas supplied from the exhaust gas receiver 110; a cleaning unit 130 that removes and cleans $SO_x$ and soot by spraying cleaning water to the exhaust gas supplied through the turbo charger 120 and cools the exhaust gas by circulating cooling water; a $CO_2$ absorbing unit 140 that absorbs and removes $CO_2$ by spraying an absorbent liquid to the exhaust gas having passed through the cleaning unit 130; a scavenge air receiver 150 that temporarily stores the scavenge air compressed by the turbo charger 120, removes pulsation, and supplies air to each cylinder of the vessel engine 10; and an exhaust gas circulating unit 160 that supplies the turbo charger with the exhaust gas having passed through the $CO_2$ absorbing unit 140 so as to be mixed with outside air. Therefore, EGR and iCER are combined so that $NO_x$ generation is reduced by EGR and $CO_2$ and $SO_x$ are absorbed and converted into materials that do not affect environments, thereby preventing corrosion of an engine, improving combustion quality, increasing engine efficiency by iCER, and reducing methane slip.

Hereinafter, the apparatus for reducing greenhouse gas emission in the vessel cooperated with EGR and iCER, which has the above-described configuration, will be described in detail with reference to FIGS. 1 to 6.

First, the exhaust gas receiver 110 temporarily stores exhaust gas exhausted from each cylinder of the vessel engine 10 and removes pulsation.

Figure 1:
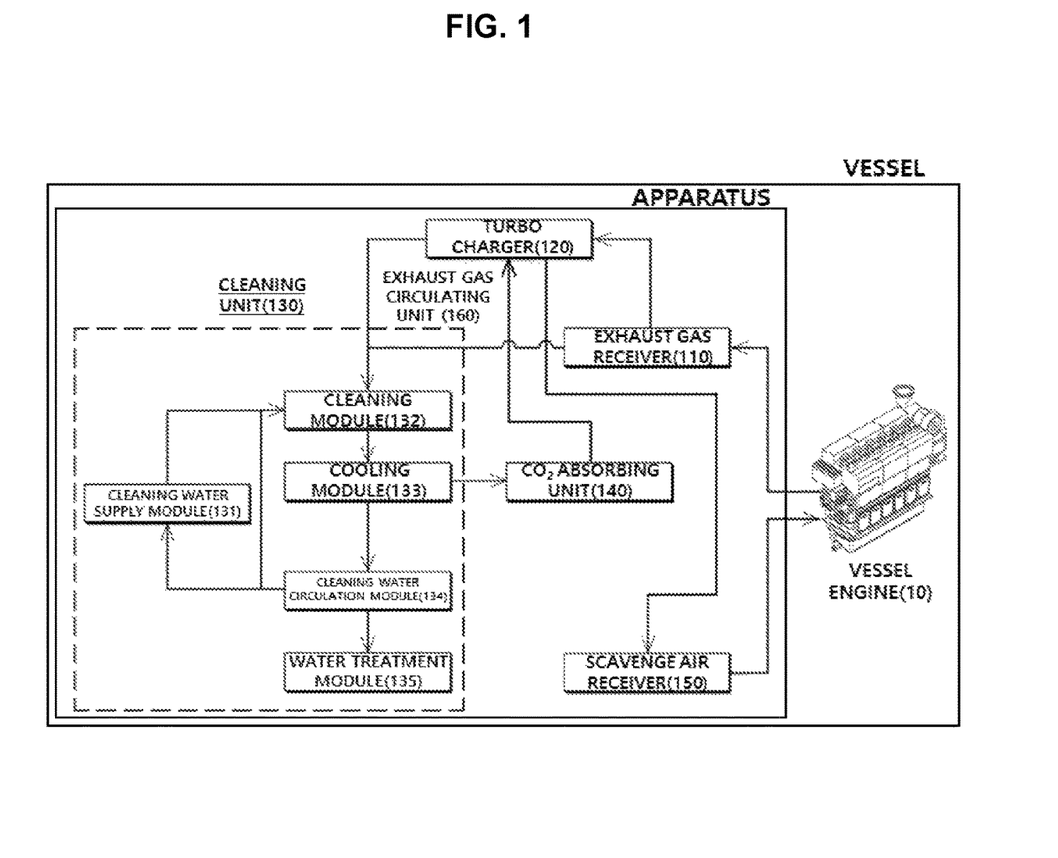
FIG. 1 is a schematic configuration diagram of an apparatus for reducing greenhouse gas emission in a vessel cooperated with EGR and iCER, according to an embodiment of the present invention.
Figure 2:
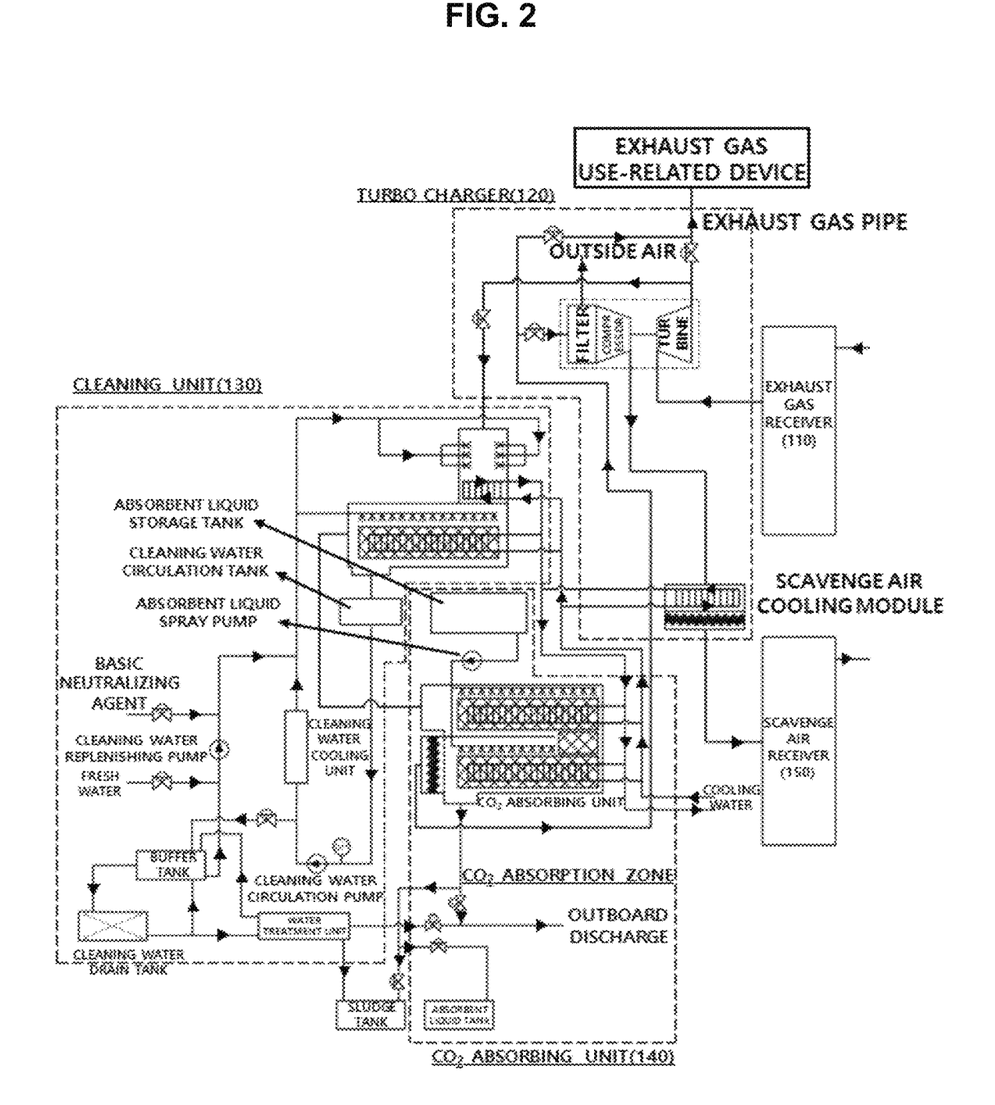
FIG. 2 is a circuit diagram of a system implementing the apparatus for reducing greenhouse gas emission in a vessel cooperated with EGR and iCER, illustrated in FIG. 1.
Figure 3:
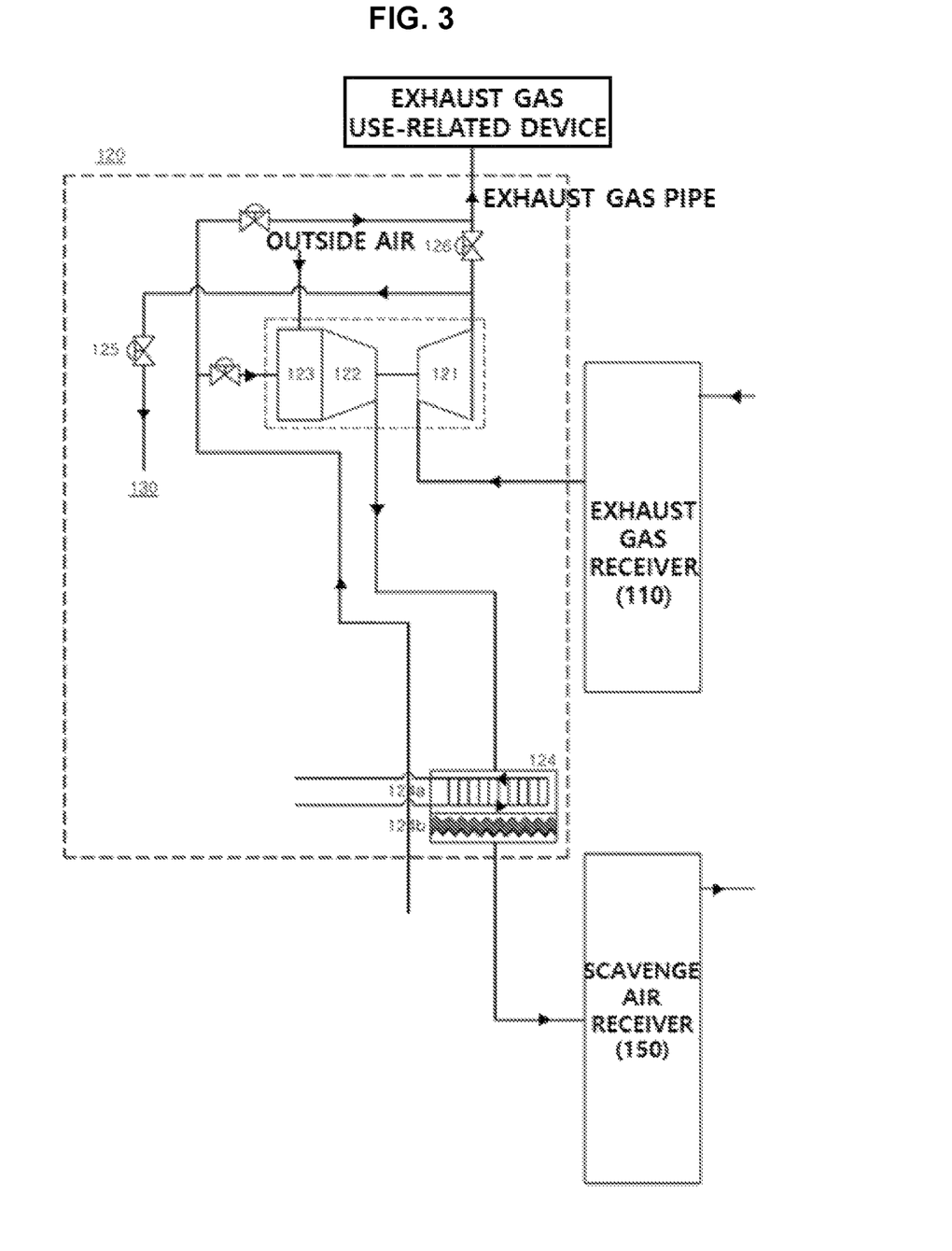
FIG. 3 separately illustrates an exhaust gas receiver and a turbo charger in the apparatus for reducing greenhouse gas emission in a vessel cooperated with EGR and iCER, illustrated in FIG. 2.

First, as illustrated in FIGS. 2 and 3, the exhaust gas receiver 110 temporarily stores high-temperature and high-pressure exhaust gas exhausted from an exhaust gas discharge port by an exhaust stroke after combustion from a combustion chamber of each of a plurality of cylinders (not illustrated) of the vessel engine 10, removes the pulsation of the exhaust gas, and supplies the exhaust gas via the turbo charger 120 to the cleaning unit 130 and an exhaust gas use-related device such as a waste heat recovery device through opening or closing of a control valve.

For example, in the vessel engine 10, since the ignition order for each cylinder is different, the discharge timing of exhaust gas is also different to cause pulsation. The exhaust gas receiver 110 is formed in a cylinder shape that has a capacity suitable for removing the pulsation of the exhaust gas pressure and can keep warm. One side of the exhaust gas receiver 110 is connected to an exhaust gas discharge port of the combustion chamber, and the other side of the exhaust gas receiver 110 is connected to an inlet side of a turbine 121 of the turbo charger 120.

Here, the vessel engine 10 may be a low-pressure two-stroke dual fuel engine that is operated at a scavenge gas pressure of 5 barg to 20 barg according to an Otto cycle. The low-pressure two-stroke dual fuel engine has low $NO_x$ emissions. Thus, even when fuel oil such as diesel is used, the low-pressure two-stroke dual fuel engine satisfies the IMO $NO_x$ emission regulation Tier III through a short-time fuel oil operation. Compared to a high-pressure two-stroke dual fuel engine, a scavenge gas pressure is less than 1/10, a relatively inexpensive gas compressor may be applied, and power consumption of the gas compressor is low, thereby reducing operating costs.

On the other hand, in addition to the low-pressure two-stroke dual fuel engine, a four-stroke dual fuel engine capable of generating auxiliary power from available boil-off gas may also be applied as the vessel engine 10.

Next, the turbo charger 120 compresses scavenge air using high-temperature and high-pressure energy of the exhaust gas supplied from the exhaust gas receiver 110 and supplies the compressed scavenge air to the scavenge air receiver 150, thereby increasing engine efficiency.

Specifically, as illustrated in FIG. 3, the turbo charger 120 may include: a turbine 121 that is rotated by the high-temperature and high-pressure exhaust gas supplied from the exhaust gas receiver 110; a compressor 122 that is coupled to a rotation shaft of the turbine 121 and rotated to compress scavenge air in which recirculating exhaust gas and outside air are mixed, and supply the compressed scavenge air to the scavenge air receiver 150; an air suction filter 123 that is formed on the suction port side of the compressor 122 and filters foreign matter from the outside air and the exhaust gas from which $CO_2$ has been removed by passing through a $CO_2$ absorbing unit 140, and mixes the outside air with the exhaust gas; a scavenge air cooling module 124 that cools the scavenge air supplied from the compressor 122 to the scavenge air receiver 150; a first control valve 125 that controls a flow rate of the exhaust gas supplied from the turbine 121 to the cleaning unit 130; and a second control valve 126 that controls a flow rate of the exhaust gas supplied from the turbine 121 to the exhaust gas use-related device.

In addition, when damage to the exhaust gas use-related device connected to the exhaust gas pipe of the turbine 121 is expected due to a high load or high-temperature exhaust gas, the opening or closing of the second control valve 126 may be controlled so that the flow rate of the exhaust gas to the cleaning unit 130 is increased to decrease the temperature of the exhaust gas.

In addition, the scavenge air cooling module 124 may include: a cooling jacket 124a of one or more stages that cools scavenge air by circulating cooling water; and a mist catcher 124b that is formed in a curved multi-plate shape and removes moisture from the scavenge air having passed through the cooling jacket 124a. The scavenge air cooling module 124 may suppress the increase in temperature due to compression of scavenge air by the compressor 122 to increase turbo charger efficiency and air density, thereby improving the efficiency of the vessel engine 10.

Figure 4:
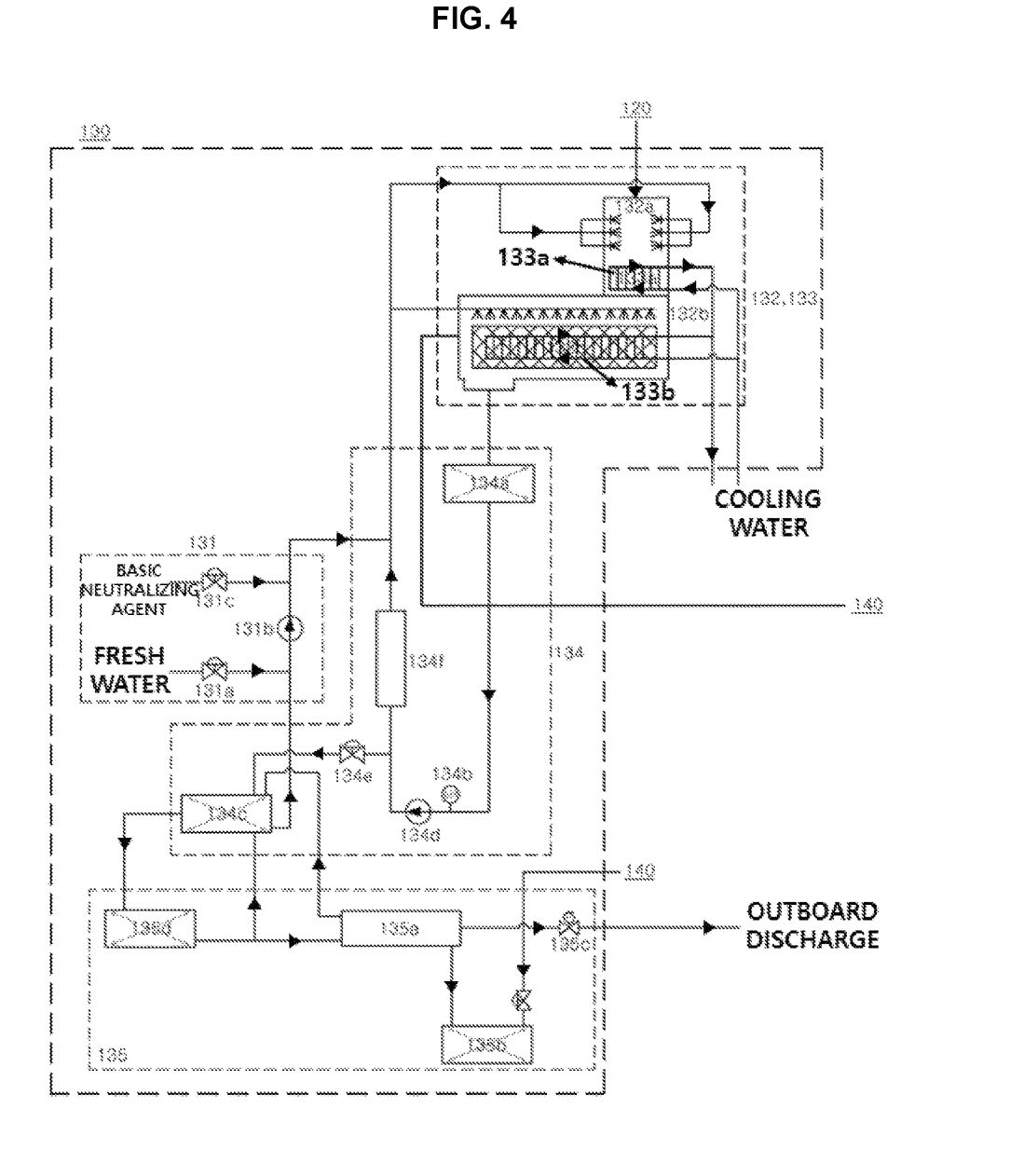
FIG. 4 separately illustrates a cleaning unit in the apparatus for reducing greenhouse gas emission in a vessel cooperated with EGR and iCER, illustrated in FIG. 2.

Next, the cleaning unit (EGR) 130 is a component that cleans, cools, and neutralizes the exhaust gas. The cleaning unit 130 removes and cleans $SO_x$ and soot contained in the exhaust gas by sequentially spraying cleaning water primarily and secondarily to the exhaust gas supplied through the turbo charger 120, and cools the exhaust gas by circulating the cooling water, and supplies the cooled exhaust gas to the $CO_2$ absorbing unit 140.

For reference, in the combustion chamber of the vessel engine 10, a portion of oxygen contained in the scavenge air is combusted with fuel to generate $CO_2$, and the remaining portion thereof generates $NO_x$ and $SO_x$. The cleaning unit 130 cleans and cools the exhaust gas containing a large amount of $CO_2$ after combustion, and supplies only the minimum $O_2$ required for combustion to the combustion chamber of the vessel engine 10, thereby increasing the $CO_2$ concentration of the scavenge air itself and lowering the $O_2$ concentration to suppress the generation of $NO_x$.

Specifically, as illustrated in FIG. 4, the cleaning unit 130 may include: a cleaning water supply module 131 that receives fresh water, neutralizes and supplies the circulating cleaning water; a cleaning module 132 that cools and cleans the exhaust gas supplied from the turbo charger 120 by spraying the cleaning water supplied from the cleaning water supply module 131 to the exhaust gas supplied from the turbo charger 120; a cooling module 133 that cools the exhaust gas by circulating the cooling water; a cleaning water circulation module 134 that circulates the cleaning water through the cleaning module 132; and a water treatment module (water treatment system (WTS)) 135 that performs water treatment on the cleaning water.

The cleaning water supply module 131 includes: a cleaning water replenishing pump 131b that receives fresh water through opening of a fresh water supply valve 131a, replenishes the circulating cleaning water, and supplies the cleaning water to the cleaning module 132; and a neutralizing agent supply valve 131c that supplies a neutralizing agent for controlling pH to the circulating cleaning water supplied from the cleaning water replenishing pump 131b to the cleaning module 132. Here, the neutralizing agent may be a basic neutralizing agent that removes sulfuric acid generated by a reaction between the cleaning water and $SO_x$ of the exhaust gas.

The cleaning module 132 includes one or more cleaning units that remove and clean $SO_x$ and soot by spraying the cleaning water. The one or more cleaning units include: a first cleaning unit 132a disposed at a front stage to pre-spray the cleaning water supplied from the cleaning water supply module 131 or the cleaning water circulation module 134 to the exhaust gas to cool the high-temperature exhaust gas to 200° C. to 300° C. and remove and clean particle components such as $SO_x$ and soot; and a second cleaning unit 132b disposed at a rear stage to post-spray the cleaning water (EGR cooler spray) to cool the exhaust gas to about 45° C. and remove and clean particle components such as $SO_x$ and soot.

The cooling module 133 includes one or more cooling units formed below the one or more cleaning units to cool the exhaust gas to a certain temperature according to the type of the absorbent liquid by the circulating cooling water. The one or more cooling units include: a first cooling unit 133a formed below the first cleaning unit 132a to cool the exhaust gas to a certain temperature according to the type of the absorbent liquid by the circulating cooling water; and a second cooling unit 133b formed below the second cleaning unit 132b to cool the exhaust gas to a certain temperature according to the type of the absorbent liquid by the circulating cooling water.

The cleaning water circulation module 134 includes: a cleaning water circulation tank 134a that collects the cleaning water having passed through the cleaning module 132; a pH meter 134b that measures pH of the cleaning water from the cleaning water circulation tank 134a, controls the neutralizing agent supply valve 131c to set the input amount of the neutralizing agent; a buffer tank 134c that stores the initial amount of cleaning water and replenishes the cleaning water; a cleaning water circulation pump 134d and a cleaning water control valve 134e that supply a portion of the cleaning water having passed through the cleaning module 132 to the buffer tank 134c and circulate the remaining cleaning water to the cleaning module 132; and a cleaning water cooling unit 134f installed behind the cleaning water circulation pump 134d to cool the circulating cleaning water.

Here, the pH meter 134b may measure pH due to sulfuric acid contained in the circulating cleaning water and neutralize the cleaning water by controlling the neutralizing agent supply valve 131c to adjust the input amount of the basic neutralizing agent, for example, NaOH, according to the measured pH, thereby preventing corrosion of pipelines and related components through which the cleaning water circulates. The buffer tank 134c may collect and remove additional moisture generated incidentally by combustion of the exhaust gas, and may store and replenish the purified cleaning water treated by the water treatment module 135.

On the other hand, in the case of using $NH_4OH(aq)$ as the absorbent liquid of the $CO_2$ absorbing unit 140, the temperature of the exhaust gas passing through the cleaning module 132 is appropriate between 20° C. and 50° C. In the case of using NaOH as the absorbent liquid of the $CO_2$ absorbing unit 140, the temperature of the exhaust gas is appropriate between 80° C. and 100° C. Therefore, the amount and temperature of the cleaning water are different according to the absorbent liquid used. The combination of the cleaning module 132 and the cleaning water cooling unit 134f may be differently applied to satisfy the $CO_2$ absorption temperature condition of the $CO_2$ absorbing unit 140 while maintaining the cleaning power of the exhaust gas by the cleaning water, and the specifications of heat exchangers of the first cleaning unit 132a and the second cleaning unit 132b may be differently applied.

The water treatment module 135 includes: a water treatment unit 135a that performs water treatment on the cleaning water drained from the buffer tank 134c and returns the treated cleaning water to the buffer tank 134*c*; a sludge tank 135*b* that stores sludge generated by the water treatment unit 135*a*; an outboard discharge valve 135*c* that discharges the cleaning water satisfying a certain discharge condition by the water treatment unit 135*a* to the outside of the vessel; and a cleaning water drain tank 135*d* that temporarily stores the cleaning water from the buffer tank 134*c*. The water treatment module 135 separates and stores debris such as soot contained in the cleaning water and discharges the separated discharged water to the outside of the vessel.

Figure 5:
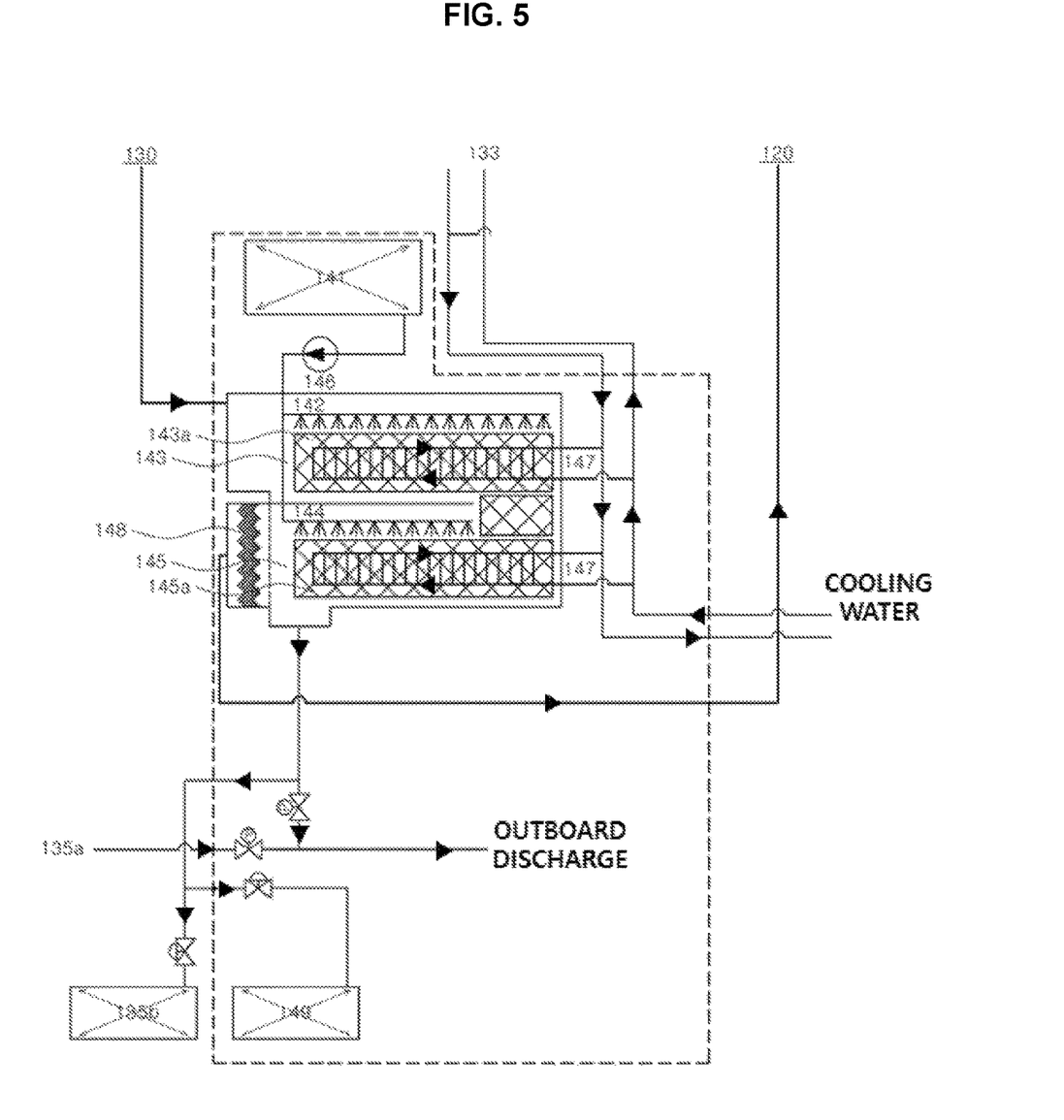
FIG. 5 separately illustrates a $CO_2$ absorbing unit in the apparatus for reducing greenhouse gas emission in a vessel cooperated with EGR and iCER, illustrated in FIG. 2.

Next, the $CO_2$ absorbing unit 140 absorbs and removes $CO_2$ by spraying the absorbent liquid to the exhaust gas having passed through the cleaning unit 130, so that the $O_2$ concentration of the exhaust gas recirculated to the combustion chamber is reduced to suppress $NO_x$ generation.

Specifically, as illustrated in FIGS. 2 and 5, the $CO_2$ absorbing unit 140 includes: an absorbent liquid storage tank 141 that stores the absorbent liquid for removing $CO_2$ through a chemical reaction; an upper spray nozzle 142 that sprays the absorbent liquid downward; an upper passage 143 that converts $CO_2$ into $NH_4HCO_3$, $NaHCO_3$, or $Na_2CO_3$ through a chemical reaction by physically contacting $CO_2$ with the absorbent liquid; a lower spray nozzle 144 that sprays the absorbent liquid downward; a lower passage 145 that converts $CO_2$ into $NH_4HCO_3$, $NaHCO_3$, or $Na_2CO_3$ through a chemical reaction by physically contacting $CO_2$ with the absorbent liquid; an absorbent liquid spray pump 146 that pumps the absorbent liquid to the upper spray nozzle 142 and the lower spray nozzle 144; a cooling module 147 that circulates the cooling water to the upper passage 143 and the lower passage 145 and cools heat generated by a $CO_2$ absorption reaction; a mist catcher 148 that is formed in a curved multi-plate shape and removes moisture from the exhaust gas having passed through the lower passage 145; and an absorbent liquid tank 149 that separates and stores the absorbent liquid having sequentially passed through the upper passage 143 and the lower passage 145.

Here, the absorbent liquid may be prepared through a separate facility in the vessel and supplied immediately, but may be pumped and supplied in the form stored in the absorbent liquid storage tank 141, and the upper spray nozzle 142 and the lower spray nozzle 144 may be applied in the form in which a plurality of auxiliary pipes having a plurality of spray holes connected to a main pipe are installed.

On the other hand, the upper passage 143 or the lower passage 145 is provided with a plurality of stages and partition walls to form a long passage so as to increase a contact time between the absorbent liquid and the exhaust gas. The upper passage 143 or the lower passage 145 sufficiently absorbs and dissolves $CO_2$ by the absorbent liquid, or converts $CO_2$ into a material satisfying the outboard discharge conditions.

In addition, packing materials 143*a* and 145*b* and a solution redistributor (not illustrated) may be formed in the upper passage 143 or the lower passage 145. In the packing materials 143*a* and 145*b*, distilling column packings designed to have a large contact area per unit volume so as to increase the contact time between the absorbent liquid and the exhaust gas are provided in multi-stages. The solution redistributor is formed between the distilling column packings provided in multi-stages.

For example, a distilling column packing suitable for a process may be selected considering the contact area per unit area, the pressure drop of the gas, and the overflow rate. Channeling of fresh water may be prevented by the solution redistributor.

On the other hand, the products and the cooling methods may be different according to the selection of the absorbent liquid that absorbs $CO_2$. That is, in the case of using $NH_4OH(aq)$ as the absorbent liquid, the absorbent liquid storage tank 141 stores $NH_4OH(aq)$ as the absorbent liquid, and $CO_2$ is absorbed and converted into $NH_4HCO_3(aq)$ by $NH_4OH(aq)$ passing through the upper passage 143 and the lower passage 145 based on [Chemical Formula 1] or [Chemical Formula 2]. The cooling module 147 is disposed in the form of a cooling jacket or a cooling coil in the upper passage 143 and the lower passage 145. Thus, by cooling heat generated by a $CO_2$ absorption reaction to 20° C. to 50° C., a smooth forward reaction of [Chemical Formula 1] or [Chemical Formula 2] may be induced.

That is, when the heat is less than 20° C., the $CO_2$ absorption rate decreases, and when the heat is greater than 50° C., the $CO_2$ absorption rate may increase, but $NH_3$ may be vaporized and disappeared. Therefore, the heat may be preferably maintained between 20° C. and 50° C.

$$NH_4OH+H_2CO_3 \rightarrow H_2O+NH_4HCO_3 \quad \text{[Chemical Formula 1]}$$

$$2NH_4OH+CO_2 \rightarrow (NH_4)CO_3+H_2O$$

$$(NH_4)_2CO_3+CO_2+H_2O \rightarrow 2NH_4HCO_3 \quad \text{[Chemical Formula 2]}$$

Alternatively, in the case of using NaOH as the absorbent liquid, the absorbent liquid storage tank 141 stores NaOH as the absorbent liquid, and $CO_2$ is absorbed and converted into $Na_2CO_3$ or $NaHCO_3$ by NaOH passing through the upper passage 143 and the lower passage 145 based on, for example, [Chemical Formula 3] or [Chemical Formula 4]. Since the cooling module 147 cools heat generated by a $CO_2$ absorption reaction to 80° C. to 100° C., a smooth forward reaction of [Chemical Formula 3] or [Chemical Formula 4] may be induced.

$$2NaOH(aq)+CO_2(g) \rightarrow Na_2CO_3(aq)+H_2O(l) \quad \text{[Chemical Formula 3]}$$

$$Na_2CO_3(aq)+H_2O(l) \rightarrow 2NaHCO_3(aq) \quad \text{[Chemical Formula 4]}$$

On the other hand, the absorbent liquid stored in the absorbent liquid tank 149 after passing through the upper passage 143 and the lower passage 145 may be regenerated or disposed of, and emissions discharged from the $CO_2$ absorbing unit 140 may be stored in the sludge tank 135*b* or discharged to the outside of the vessel by the valve control.

Next, as illustrated in FIG. 3, a scavenge air receiver 150 temporarily stores scavenge air, from which $CO_2$ is removed by passing through the $CO_2$ absorbing unit 140, of which $O_2$ concentration is lowered, and which is compressed by the turbo charger 120, removes pulsation, and supplies air to each cylinder of the vessel engine 10 in a suction stroke.

For example, since the ignition order for each cylinder is different, the suction timing of the scavenge air is also different to cause pulsation. The scavenge air receiver 150 is formed in a cylinder shape that has a capacity suitable for removing the pulsation of the scavenge air pressure and can keep warm. One side of the scavenge air receiver 150 is connected to the scavenge air suction port of the combustion chamber, and the other side of the scavenge air receiver 150 is connected to the outlet side of the compressor 122 of the turbo charger 120.

Figure 6:
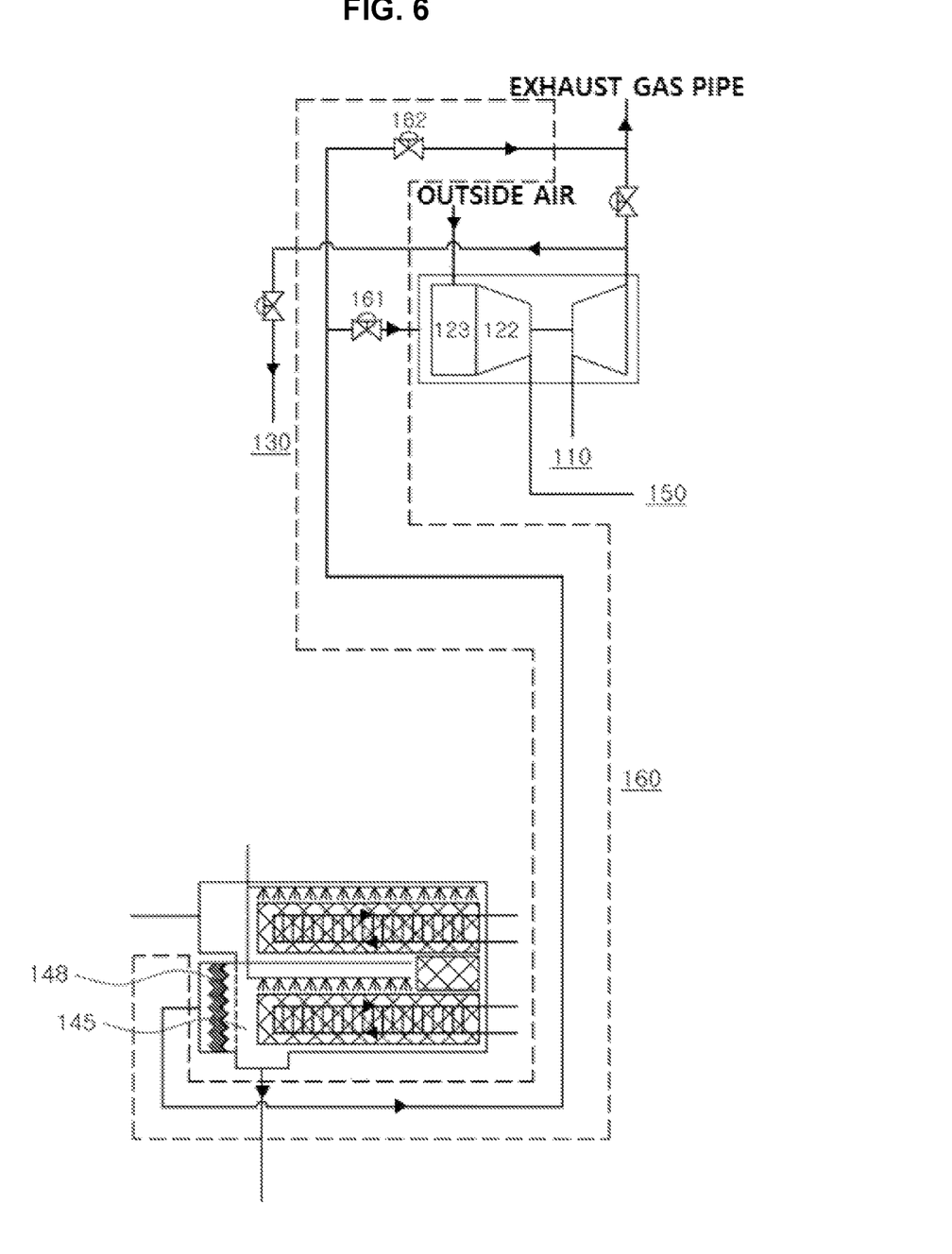
FIG. 6 separately illustrates an exhaust gas circulating unit in the apparatus for reducing greenhouse gas emission in a vessel cooperated with EGR and iCER, illustrated in FIG. 2.

Next, the exhaust gas circulating unit (Intelligent Control by Exhaust Recycling (iCER)) 160 supplies the exhaust gas having passed through the $CO_2$ absorbing unit 140 to the turbo charger 120 so as to mix the exhaust gas with the outside air.

That is, as illustrated in FIG. 6, the exhaust gas circulating unit 160 is a scavenge air line through which the exhaust gas having passed through the lower passage 145 and the mist catcher 148 of the $CO_2$ absorbing unit 140 is supplied to the air suction filter 123 of the turbo charger 120. The exhaust gas circulating unit 160 may individually control the flow rate of the exhaust gas supplied to the turbo charger 120 and mixed with the outside air and the flow rate of the exhaust gas supplied to the exhaust gas pipe.

For example, the flow rate of exhaust gas supplied to the air suction filter 123 may be controlled by an opening and closing control of a first valve 161, and the flow rate of exhaust gas supplied to the exhaust gas use-related device through the exhaust gas pipe by an opening and closing control of a second valve 162.

On the other hand, the reduction amount of $NO_x$ is also increased in proportion to the recirculation rate of the exhaust gas by the exhaust gas circulating unit 160, and about 30% to 40% of the entire exhaust gas may be recirculated and supplied to the vessel engine 10.

Accordingly, the cleaning unit 130 and the exhaust gas circulating unit 160 may be combined to reduce methane slip generated in the auto cycle of the dual fuel engine, to increase the ratio of $CO_2$ instead of $O_2$ in the scavenge air, and to control the $CO_2$ concentration.

In addition, the cleaning unit 130, the $CO_2$ absorbing unit 140, and the exhaust gas circulating unit 160, which have been described above, may be mounted inside the vessel engine 10 so as to save the installation space of the engine room, and may be additionally installed in the vessel in which the existing EGR system is already installed, thereby reducing the changes therein.

On the other hand, the present invention may provide a vessel including the apparatus for reducing greenhouse gas emission in the vessel cooperated with EGR and iCER.

Therefore, according to the apparatus for reducing greenhouse gas emission in the vessel cooperated with EGR and iCER and the vessel including the same, EGR and iCER may be combined so that $NO_x$ generation is reduced by EGR and $CO_2$ and $SO_x$ are absorbed and converted into materials that do not affect the environment, thereby preventing corrosion of the engine. In addition, combustion quality may be improved, and engine efficiency may be increased by iCER. Methane slip may be reduced. By removing $SO_x$ and $CO_2$ from the recirculating exhaust gas, corrosion of the engine may be prevented, and environmental pollution may be reduced. The apparatus may be mounted inside the vessel engine so as to save the installation space, thereby securing the free space in the engine room. Furthermore, the apparatus may be additionally installed in the vessel in which the existing EGR system is already installed, thereby reducing the changes therein.

The present invention has been described above with reference to the embodiments illustrated in the drawings. However, the present invention is not limited thereto, and various modifications or other embodiments falling within the scope equivalent to the present invention can be made by those of ordinary skill in the art. Therefore, the true scope of protection of the present invention should be determined by the appended claims.

The invention claimed is:

1. An apparatus for reducing greenhouse gas emission in a vessel cooperated with Exhaust Gas Recirculation (EGR) and Intelligent Control by Exhaust Recycling (iCER), the apparatus comprising:
    an exhaust gas receiver that stores exhaust gas exhausted from each cylinder of a vessel engine and removes pulsation;
    a turbo charger that compresses and supplies scavenge air by the exhaust gas supplied from the exhaust gas receiver;
    a cleaning unit that cleans and removes $SO_x$ and soot by spraying cleaning water to the exhaust gas supplied through the turbo charger and cools the cleaned exhaust gas by circulating cooling water;
    a $CO_2$ absorbing unit that absorbs and removes $CO_2$ by spraying an absorbent liquid to the exhaust gas having passed through the cleaning unit;
    a scavenge air receiver that stores the scavenge air compressed by the turbo charger, removes pulsation, and supplies air to each cylinder of the vessel engine; and
    an exhaust gas circulating unit that supplies the turbo charger with the exhaust gas having passed through the $CO_2$ absorbing unit so as to be mixed with outside air.

2. The apparatus according to claim 1, wherein the vessel engine is a low-pressure two-stroke dual fuel engine or a four-stroke dual fuel engine.

3. The apparatus according to claim 1, wherein the turbo charger comprises:
    a turbine that is rotated by high-temperature and high-pressure exhaust gas supplied from the exhaust gas receiver;
    a compressor that is coupled to a rotation shaft of the turbine and rotated to compress scavenge air and supply the compressed scavenge air to the scavenge air receiver;
    an air suction filter that is formed on a suction port side of the compressor to filter foreign matter from the outside air and the exhaust gas from which $CO_2$ has been removed by passing through the $CO_2$ absorbing unit, and mix the outside air with the exhaust gas;
    a scavenge air cooling module that cools the scavenge air supplied from the compressor to the scavenge air receiver;
    a first control valve that controls a flow rate of exhaust gas from the turbine to the cleaning unit; and
    a second control valve that controls a flow rate of exhaust gas supplied from the turbine to an exhaust gas use-related device.

4. The apparatus according to claim 3, wherein, when damage to the exhaust gas use-related device connected to an exhaust gas pipe of the turbine is expected due to a high load or high-temperature exhaust gas, opening or closing of the second control valve is controlled so that the flow rate of the exhaust gas to the cleaning unit is increased to decrease the temperature of the exhaust gas.

5. The apparatus according to claim 3, wherein the scavenge air cooling module comprises:
    a cooling jacket of one or more stages that cools the scavenge air by circulating cooling water; and
    a mist catcher that is formed in a curved multi-plate shape and removes moisture from the scavenge air having passed through the cooling jacket.

6. The apparatus according to claim 1, wherein the cleaning unit comprises:
    a cleaning water supply module that receives fresh water, neutralizes and supplies the circulating cleaning water;

a cleaning module that cools and cleans the exhaust gas from the turbo charger by spraying the cleaning water supplied from the cleaning water supply module to the exhaust gas supplied from the turbo charger;

a cooling module that cools the exhaust gas by circulating the cooling water;

a cleaning water circulation module that circulates the cleaning water through the cleaning module; and a water treatment module that performs water treatment on the cleaning water.

7. The apparatus according to claim 6, wherein the cleaning water supply module comprises:

a cleaning water replenishing pump that receives fresh water, replenishes cleaning water, and supplies the cleaning water to the cleaning module; and a neutralizing agent supply valve that supplies a neutralizing agent for controlling pH to the circulating cleaning water supplied from the cleaning water replenishing pump to the cleaning module, the cleaning module comprises one or more cleaning units that remove and clean $SO_x$ and soot by spraying the cleaning water, the cooling module comprises one or more cooling units formed below the one or more cleaning units to cool the exhaust gas to a certain temperature according to a type of the absorbent liquid by the circulating cooling water, the cleaning water circulation module comprises:

a cleaning water circulation tank that collects the cleaning water having passed through the cleaning module;

a pH meter that measures pH of the cleaning water from the cleaning water circulation tank, controls the neutralizing agent supply valve to set an input amount of the neutralizing agent;

a buffer tank that storing an initial amount of cleaning water and replenishes the cleaning water;

a cleaning water circulation pump and a cleaning water control valve that supply some of the cleaning water having passed through the cleaning module to the buffer tank and circulate a remaining cleaning water to the cleaning module; and a cleaning water cooling unit that is installed behind the cleaning water circulation pump and cools the circulating cleaning water, and the water treatment module comprises:

a water treatment unit that performs water treatment on the cleaning water drained from the buffer tank and returns the treated cleaning water to the buffer tank;

a sludge tank that stores sludge by the water treatment unit;

an outboard discharge valve that discharges the cleaning water satisfying a certain discharge condition by the water treatment unit to the outside of the vessel; and a cleaning water drain tank that stores the cleaning water from the buffer tank.

8. The apparatus according to claim 1, wherein the $CO_2$ absorbing unit comprises:

an absorbent liquid storage tank that stores the absorbent liquid;

one or more spray nozzles that spray the absorbent liquid;

one or more passages that converts $CO_2$ into a certain material through a chemical reaction by contacting $CO_2$ with the absorbent liquid;

an absorbent liquid spray pump that pumps the absorbent liquid to the one or more spray nozzles;

a cooling module that circulates the cooling water to the one or more passages and cools heat generated by a $CO_2$ absorption reaction;

a mist catcher that is formed at an end of the passage in a curved multi-plate shape and removes moisture from the exhaust gas having passed through the passage; and an absorbent liquid tank that separates and stores the absorbent liquid having passed through the passage.

9. The apparatus according to claim 8, wherein the one or more spray nozzles comprise an upper spray nozzle and a lower spray nozzle that spray the absorbent liquid downward, the one or more passages comprise an upper passage and a lower passage that convert $CO_2$ into the certain material through a chemical reaction by contacting $CO_2$ with the absorbent liquid, the absorbent liquid spray pump pumps the absorbent liquid to the upper spray nozzle and the lower spray nozzle, and the cooling module cools heat generated by the $CO_2$ absorption reaction by circulating cooling water to the upper passage and the lower passage.

10. The apparatus according to claim 9, wherein the upper passage or the lower passage is provided with a plurality of stages and partition walls to form a long passage so as to increase a contact time between the absorbent liquid and the exhaust gas.

11. The apparatus according to claim 9, wherein packing materials, in which distilling column packings designed to have a large contact area per unit volume so as to increase a contact time between the absorbent liquid and the exhaust gas are provided in multi-stages, and a solution redistributor, which is formed between the distilling column packings provided in multi-stages, are formed in the upper passage or the lower passage.

12. The apparatus according to claim 9, wherein the absorbent liquid storage tank stores $NH_4OH(aq)$ as the absorbent liquid, $CO_2$ is absorbed and converted into $NH_4HCO_3(aq)$ by $NH_4OH(aq)$ passing through the upper passage and the lower passage, and the cooling module is disposed in the form of a cooling jacket or a cooling coil in the upper passage and the lower passage and cools heat generated by the $CO_2$ absorption reaction to 20° C. to 50° C.

13. The apparatus according to claim 9, wherein the absorbent liquid storage tank stores $NaOH(aq)$ as the absorbent liquid, $CO_2$ is absorbed and converted into $NaHCO_3$ or $Na_2CO_3$ by $NH_4OH(aq)$ passing through the upper passage and the lower passage, and the cooling module cools heat generated by the $CO_2$ absorption reaction to 80° C. to 100° C.

14. The apparatus according to claim 8, wherein the certain material discharged through the passage is stored in a sludge tank or discharged to the outside of the vessel.

15. The apparatus according to claim 4, wherein the exhaust gas circulating unit comprises:

a first valve that controls a flow rate of exhaust gas supplied to the air suction filter; and a second value that controls a flow rate of exhaust gas supplied to the exhaust gas use-related device through the exhaust gas pipe.

16. The apparatus according to claim 4, wherein a flow rate of the exhaust gas supplied to the turbo charger and mixed with the outside air and a flow rate of the exhaust gas supplied to the exhaust gas pipe are individually controlled.

17. The apparatus according to claim 1, wherein the cleaning unit, the $CO_2$ absorbing unit, and the exhaust gas circulating unit are mounted inside the vessel engine.

18. A vessel comprising the apparatus according to claim 1.

* * * * *